United States Patent Office 3,526,512
Patented Sept. 1, 1970

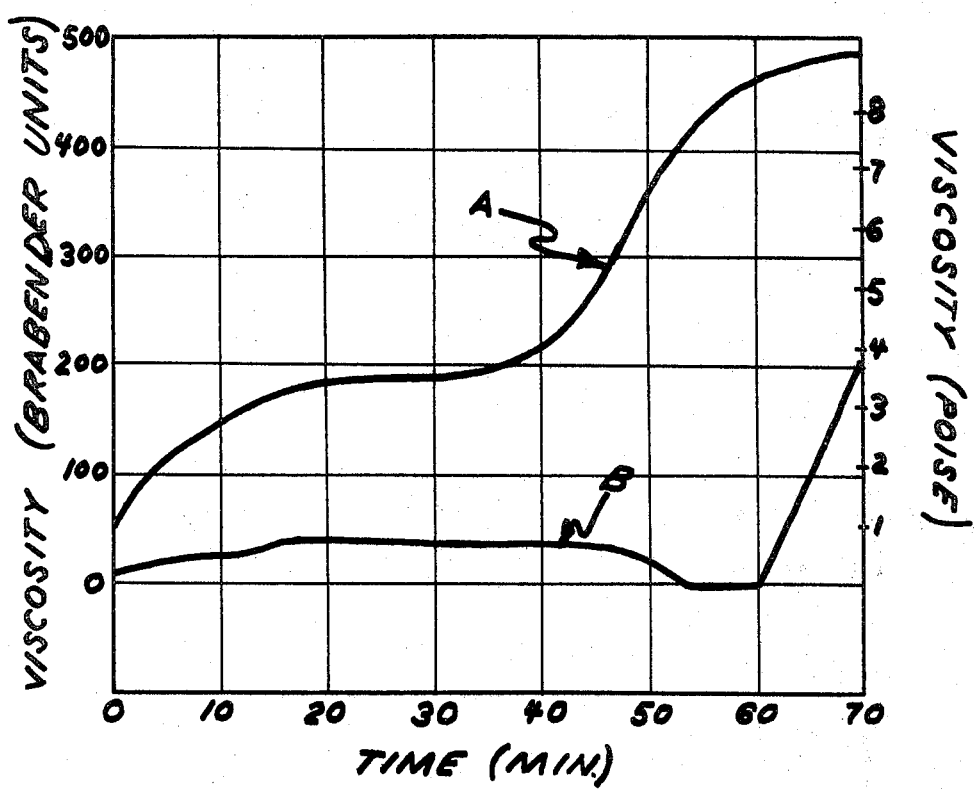

3,526,512
INSTANT GRITS
James T. Collins, Palatine, and Roy G. Hyldon, Crystal Lake, Ill., assignors to The Quaker Oats Company, Chicago, Ill., a corporation of New Jersey
Filed Nov. 8, 1967, Ser. No. 681,345
Int. Cl. A23l 1/10
U.S. Cl. 99—83
8 Claims

ABSTRACT OF THE DISCLOSURE

An instant-type food product of the corn grits type is produced by: (A) admixing corn grits, critical amounts of water, a polysaccharide gum, and an emulsifier selected from the group polyoxyethylene sorbitan monostearate, polyoxyethylene sorbitan mono-oleate, glyceryl monostearate, and a mixture of monoglycerides and diglycerides of edible fats, oils, and fat-forming fatty acids; (B) heating the mixture to a critical temperature range; (C) drying the heated mixture by forming a thin sheet on a drum drier; and (D) comminuting the cooked, dried sheet.

BACKGROUND OF THE INVENTION

Field of the invention

This invention pertains to a process for producing an instant food product of the corn grits type and the product produced by such process.

Description of the prior art

Our invention consitutes the first known instant-type food product and process for a corn grits product. It has heretofore been known that certain additives can be added to cooked and dried grain products to make them "instant" in nature, i.e. not requiring a cooking step by the consumer. Among these additives are the use of polysaccharide gums in processed oats to make instant oatmeal. Inclusion of polysaccharide gums or other additives in normally prepared corn grits products has failed to provide an instant product which would have the characteristics of normally prepared corn grits. Heretofore, then, to our knowledge, there has been no acceptable instant corn grits product that can be prepared in a bowl or prepared without a cooking step by the consumer.

SUMMARY OF THE INVENTION

It is an object of this invention to produce an instant corn grits product which may be prepared as corn grits by the mere addition of warm water to the product in a serving bowl.

It is another object of this invention to provide an instant grits product which upon the addition of warm water acquires the texture and flavor characteristics of conventionally cooked corn grits.

It is still a further object of this invention to provide a process for providing an instant corn grits product.

These objects are accomplished by a process which comprises admixing corn grits, critical amounts of water, critical amounts of a polysaccharide gum and critical amounts of an emulsifier, heating the mixture above 71° C., drying the heated mixture by forming a thin sheet on a drum drier, and collecting the dried sheet and comminuting it to form an instant-type food product.

More particularly, the polysaccharide gums used in this invention must be capable of hydrating rapidly with the addition of water and must be edible. Edible polysaccharide gums include both true gums of vegetable origin and synthetic gums such as carboxymethylcellulose, methyl cellulose and other cellulose derivatives which approximate the vegetable gums in physical and chemical properties. Both types of gums are acceptable for use in this invention.

"True gums" are gums of vegetable origin which are soluble in water or swell in contact with water to form viscous colloidal solutions. They are insoluble in oils, alcohol, benzene and other organic solvents.

A general classification of such gums is as follows:

(A) Plant gums—dried extrudates from certain trees or shrubs in the form of tears, flakes or annular fragments that have been formed by bark fissures or incisions. The more important ones include acacia (gum arabic), Australian, Cape, carmania, gedda, ghatti, karaya, mesquite, mogadore, Persian, shiraz, talha and tragacanth. Others of lesser importance include amrad, angico, apricot, brea, cashew, cebil, cedar, chagual, cherry, damson, jeol, mango, plum and sassa.

(B) Plant mucilages—derived from seeds, roots or other plant parts usually by extraction with water. This class includes gums derived from althea root, chia seed, Iceland moss, linseed (flaxseed), slippery elm bark and guar gum.

(C) Mucilaginous materials known as hydrophylic colloids obtained from two general groups of brown and red algae. This class includes agar, Irish moss (carrageen) and algin.

When the source material for the gum is acidic, i.e. algin and Irish moss, the commercially available edible gum is a derivative of the acid such as a soluble salt or ester, i.e. propylene glycol ester of alginic acid. In general, to be satisfactory, any gum employed must be edible, have no undesirable flavor, and disperse rapidly in hot water.

Likewise, the emulsifier used with this invention must possess certain properties. It must be edible and have no undesirable flavor. Among the emulsifiers that we have found to exhibit these properties and be acceptable for use in this invention are polyoxyethylene sorbitan monostearate, polyoxyethylene sorbitan mono-oleate, glyceryl monostearate, and a mixture of monoglycerides and diglycerides of edible fats, oils, and fat-forming fatty acids.

By reference to a mixture of monoglycerides and diglycerides of edible fats, oils, and fat-forming fatty acids, we are referring to a commercial product known as Atmos 300 (Atlas Chemical Industries, Inc.) or to a mixture of these components which approaches the hydrophilic-lipophilic balance of the commercial product, i.e. HLB of about 2.8.

The concentrations of both the polysaccharide gum and the emulsifier are critical. The polysaccharide gum must be present in an amount of from 0.5 to 3.5 percent by weight of the finished corn grits product and preferably from 1.0 to 3.0 percent by weight of the finished corn grits product. The emulsifier must be present in an amount of from 10 parts per million to 2 percent by weight based on the weight of the finished corn grits product when less than 10 percent by weight of the grits have a particle size sufficient to pass through a U.S. No. 25 screen, and the emulsifier must be present in an amount of from 50 parts per million to 2 percent by weight based on the weight of the finished corn grits product (and preferably from 50 to 75 parts per million) when greater than 10 percent by weight of the grits have a particle size sufficient to pass through a U.S. No. 25 screen.

It is contemplated, alternatively, that mixtures of the aforementioned gums may be employed instead of a single gum as long as the critical levels of gum are maintained.

Likewise, it is contemplated, alternatively, that mixtures of the aforementioned emulsifiers may be employed instead of a single emulsifier in this invention as long as the critical levels of emulsifier are maintained.

Our new and unique process consists of the steps:

(A) Admixing corn grits, water in an amount sufficient to bring the moisture content to from 50 to 90 percent by weight of the total mixture, and a polysaccharide gum and emulsifier of the type and quantity defined above;

(B) Heating the mixture until the temperature of the mixture is above 71° C.;

(C) Cooking and drying the heated mixture by forming it in a thin sheet on a rotating, internally-heated drum drier; and (D) Collecting the dried sheet of product containing discrete particles in a starch matrix and comminuting the dried sheet to form an instant-type food product.

We have found that while it is not necessary, it is preferred to add the emulsifier as a homogenized mixture of one part by weight emulsifier, 50 parts by weight water, and 50 parts by weight of an edible oil such as corn oil.

The temperature to which the product must be raised by heating is critical, and must be above the gelatinization point of the starch in the grain, i.e. about 71° C. (160° F.), but the temperature must not exceed a point at which degradation of the grits occurs, i.e. about 121° C. (250° F.).

We have found that any of the commercially available comminuting machines are acceptable for comminuting the cooked and dried sheet of discrete particles in a starch matrix. It is preferred, however, that the comminution be such that the product has the following particle size distribution according to a Ro-Tap particle size distribution analysis:

10 MINUTES ON RO-TAP (# refers to U.S. sieve numbers)
(% refers to weight percent)

| | |
|---|---|
| On a #12 | Less than 1%. |
| Through a #12 and on a #16 | 17% to 25%. |
| Through a #16 and on a #20 | 37% to 43%. |
| Through a #20 and on a #30 | 14% to 19%. |
| Through a #30 and on a #40 | 4% to 7%. |
| Through a #40 | Less than 20%. |

While the above is a preferred particle size distribution for the comminuted product, any particle size distribution which will give approximately the same hydration rate as the above distribution will be acceptable.

In addition to making our product instant in nature, our unique process has awarded us several other benefits. First, the combination of additives has provided a mixture which will form a sheet on a drum drier. By "drum drier" we intend to mean any endless plate which can be heated from a side opposite the side contacted by the product. Normally, one would not attempt to use a drum drier to dry a mixture of discrete particles in a starch matrix. This is so because the discrete particles would cause voids or tears in the attempted sheet, resulting in an uneven mass rather than a thin, continuous and consistent sheet which could be subjected to uniform drying and heat treatment. Our unique combination of additives has made possible the drying of the product on a drum drier which gives us the desired properties of our product.

By the term "drying" as used herein, we intend to mean reducing the water content to below 10 percent by weight.

The product, as formed on the drum drier, preferably has a thickness of from 0.030 to 0.040 inch. This can be accomplished by setting the space between the drums at from 0.020 to 0.025 inch, the increase in product thickness being attributed to "memory" or the ability of the material to recover part of its previous position.

Another distinct advantage of our process is that it is successful for corn grits from a wide variety of sources. Ordinarily, corn grits vary in makeup (fat content, etc.) depending on the location from which they are produced and the processing employed in making the grits. As a result of this, processes involving corn grits normally require major alteration to adjust to the changes in the grits. We have found, however, that only a minor adjustment is necessary for our process. Our new combination of additives has provided us with the unexpected result that regardless of the source of corn grits, we can produce an excellent product merely by adding in the process a polysaccharide gum and by adding from 50 parts per million to 2 percent by weight based on the weight of the corn grits of an emulsifier whenever the grits are found to have a particle size such that more than 10 percent by weight of the grits will pass through a U.S. No. 25 screen, and adding from 10 parts per million to 2 percent by weight emulsifier when less than 10 percent by weight of the grits will pass through a U.S. No. 25 screen.

Still another advantage of our new combination of additives becomes apparent after the product is prepared for use. When conventional corn grits are prepared in large quantities and stored on a steam table or the like to keep them warm until serving, they soon become an adhesive mass or cake and lose the texture associated wtih grits. Our new process, however, has provided us with a corn grits product wherein the forming of an adhesive mass or cake is postponed several hours. This results in a product which retains the grits texture for the longest of normal serving times for the product.

By the term "corn grits" in reference to our food product, we intend to refer to particles of the endosperm of corn which have been subdivided to the extent that not less than 95 percent by weight of the particles pass through a No. 10 sieve and not more than 20 percent by weight of the particles pass through a No. 25 sieve.

By the term "instant" in reference to our food product, we intend to refer to a product which can be prepared in a bowl by mere addition of water and without a cooking step by the consumer. We have thus provided a product which eliminates the cooking pan and extensive cooking time required for conventional corn grits. While room temperature water (about 25° C.) can be added to our product to rehydrate it, it is preferred to use boiling water as this requires less time and provides a product at the temperature normally preferred.

Our new and unique process results in a product which cannot be produced by any other method. Simple mixing of the ingredients fails to produce an acceptable product. Likewise, simple mixing of the ingredients and cooking in a pan or oven fails to produce an acceptable product. Therefore, we have invented a new and useful product which can be produced only by our new and unique process.

BRIEF DESCRIPTION OF THE DRAWING

This invention may be more fully explained by the accompanying drawings in which the product of this invention is compared to the best known prior product, which is not an instant product.

The enclosed drawing is a graph of the results of a standard amylograph test. For each test, 60 grams of a corn grits product was added to 440 grams of water. The resulting slurry was quickly added to the cup of an Amylograph-Viscograph, Model GEDC, Brabender Co., Rochelle Park, N.J. The temperature of the grits-water mixture was then increased from room temperature to 40° C. and held at 40° C. until the viscosity showed little or no change (i.e. about 23 minutes total time). At this point, the temperature control was adjusted to increase the temperature at a rate of 1.5° C. per minute. This temperature increase was continued until the temperature reached 96° C., at which point the temperature was held constant. This testing procedure is more fully explained (using different temperatures) in Starch: Chemistry and Technology, Whistler and Paschall, Academic Press, 1967, pages 599–601. The viscosity was recorded via a graphic print-out mechanism and these results are shown in the drawing.

The amylograph test illustrated by the enclosed drawing shows the exceptional advance made by our invention. In the graph, a product made in accordance with this invention (the top line designated by the letter A) is compared to the best known prior product, the "quick" or "one minute" grits (the bottom line designated by the letter B). The product produced in accordance with this invention (designated by letter A) is the product produced in accordance with Example 1 which hereinafter follows. The other product (designated by letter B) is a sample of "quick" grits obtained from a grocery store shelf. A corn grits product that is ready to eat would show a viscosity on the graph of about 175 Brabender units. It may clearly be seen that our product has a very rapid hydration rate and quickly becomes a product that is ready to eat. The prior product, on the other hand, is almost unresponsive to heat and water until it begins to cook at about 96° C., i.e. after 60 minutes on the graph. When this is compared to our product, it may be seen that our product has achieved the same viscosity properties within only a few minutes of mixing with water (i.e. about 18 minutes), and that this is accomplished with only warm water and without cooking. When our product is added to hot water (i.e. near boiling) the product becomes edible "instantly," i.e. after a short period of time without further cooking, and need not be cooked. It may thus be seen that we have developed an "instant" corn grits product which can be prepared by mere addition of hot or boiling water and without additional cooking. We have likewise shown that the prior known products fail to accomplish these much sought after results. Our advance may thus be more fully appreciated by realizing that a product produced by the process of our invention may be prepared in the bowl without resorting to cooking in the pan.

DESCRIPTION OF PREFERRED EMBODIMENTS

This invention will be further illustrated but is not limited by the following examples and preferred embodiments.

EXAMPLE 1

An emulsion was prepared by mixing 100 parts by weight corn oil, 100 parts by weight water, and 1 part by weight polyoxyethylene sorbitan mono-oleate (Tween 80, Atlas Chemical Industries, Inc.). This mixture was heated to 160° F. and homogenized at 1000–2000 p.s.i. to form a homogeneous emulsified mixture.

Two parts by weight corn grits, having a particle size such that 17 percent by weight of the grits passed through a U.S. No. 25 screen, and three parts by weight water were added to a batch mixer. An amount of the above-defined emulsified mixture was added so that the concentration of the polyoxyethylene sorbitan mono-oleate was 50 parts per million based on the weight of the corn grits. Next, 0.028 part of carboxymethyl cellulose (CMC7HOF, Hercules, Inc.) were added. The components were then mixed thoroughly until a uniform mixture was obtained. The mixture at this point was at room temperature, i.e. about 25° C. (77° F.). The mixture (slurry) was then passed through a steam injector and steam was injected into it until it was at a temperature of about 80° C. (176° F.). The mixture at this point has viscosity characteristics approaching those of prepared corn grits. The steam-treated mixture was then placed on an internally-heated, rotating double drum drier in a thin sheet. The product was then removed in a thin sheet having a thickness of about 0.035 inch and comminuted to the particle size of corn grits.

EXAMPLE 2

Example 1 was repeated with the exception that the emulsifier was polyoxyethylene sorbitan monostearate (Tween 60, Atlas Chemical Industries, Inc.).

EXAMPLE 3

Example 1 was repeated with the exception that the emulsifier was glyceryl monostearate (Myvaplex Type 600, Distillation Products Industries).

EXAMPLE 4

Example 1 was repeated with the exception that the emulsifier was a mixture of monoglycerides and diglycerides of edible fats, oils and fat-forming fatty acids (Atmos 300, Altas Chemical Industries, Inc.).

EXAMPLE 5

Example 1 was repeated with the exception that the the polysaccharide gum was guar gum (Jaguar J2S1, Stein, Hall and Co., Inc.).

While guar gum and polyoxyethylene sorbitan monooleate were used in this example as the thickening agent and emulsifier respectively, any of the polysaccharide gums and emulsifiers hereinbefore defined are acceptable for use in our process in making an instant corn grits product.

The products of Examples 1–5 were tested as instant corn grits by employing the following recipe:

Place ¼ cup (about 24.0 grams) of the corn grits product of this invention in a bowl. Pour ½ cup water (preferably boiling) over the product and stir until blended. Season to taste. In each of the above cases, the products were found to have the taste and texture characteristics of normally prepared corn grits. Examples 1–5 are each in accordance with this invention.

EXAMPLE 6

Example 1 was repeated without the use of a polysaccharide gum and emulsifier. The product would not form a sheet on the drum drier and consequently formed a product which was unacceptable (very gummy) upon rehydration. It may then be seen that when the grits have a particle size wherein more than 10 percent by weight of the grits (in this case 17 percent) will pass through a U.S. No. 25 screen, the polysaccharide gum and emulsifier as hereinbefore described must be present in the amounts as hereinbefore described. This example is not in accordance with this invention.

It may thus be seen that we have invented a new and useful process which produces a new and unique product.

We claim:

1. A process for producing an instant-type food product which upon the addition of water and without need for heating to boiling temperatures acquires the flavor and texture characteristics of cooked corn grits, said process comprising the steps:
   (A) admixing
   (1) corn grits,
   (2) water, said water being added in an amount sufficient to cause the moisture content to be from 50 percent to 90 percent by weight of the total mixture,
   (3) an edible polysaccharide gum capable of rehydrating rapidly with the addition of water, said gum being added in an amount of 0.5 to 3.5 percent by weight of the finished corn grits product,
   (4) an emulsifier comprising a member selected from the group consisting essentially of polyoxyethylene sorbitan monostearate, polyoxyethylene sorbitan mono-oleate, glyceryl monostearate, and a mixture of monoglycerides and diglycerides of edible fats, oils, and fat forming fatty acids, said emulsifier being added in an amount of from 10 parts per million to 2 percent by weight based on the weight of the corn grits when less than 10 percent by weight of the grits have a particle size sufficient to pass through a U.S. No. 25 screen, and said emulsifier being present in an amount of from 50 parts per million to 2 percent by weight based on the weight of the corn grits when greater than 10 percent by weight of the grits have a particle size sufficient to pass through a U.S. No. 25 screen;

(B) heating the above mixture until the temperature of the mixture is above 71° C.;
(C) drying the heated mixture in the form of a thin sheet on a drum drier; and
(D) collecting the dried sheet of product containing discrete particles in a starch matrix and comminuting the dried sheet to form an instant-type corn grits product.

2. A process according to claim 1 wherein the edible polysaccharide gum that is added is carboxymethyl cellulose.

3. A process according to claim 1 wherein the edible gum that is added is guar gum.

4. A process as in claim 1 wherein the emulsifier that is added is polyoxyethylene sorbitan monostearate.

5. A process as in claim 1 wherein the emulsifier that is added is polyoxyethylene sorbitan mono-oleate.

6. A process as in claim 1 wherein the emulsifier that is added is glyceryl monostearate.

7. A process as in claim 1 wherein the edible polysaccharide gum that is added is carboxymethylcellulose and the emulsifier that is added is polyoxyethylene sorbitan mono-oleate.

8. A product produced by the process as defined in claim 1.

References Cited

UNITED STATES PATENTS

| | | | |
|---|---|---|---|
| 2,541,730 | 2/1951 | Walker | 99—80 |
| 2,890,118 | 6/1959 | Cantor et al. | 99—83 |
| 2,999,018 | 9/1961 | Huffman et al. | 99—83 |

RAYMOND N. JONES, Primary Examiner

J. R. HOFFMAN, Assistant Examiner